United States Patent [19]

Nugent et al.

[11] Patent Number: 4,470,012

[45] Date of Patent: Sep. 4, 1984

[54] APPARATUS FOR GENERATING RATE SIGNALS

[75] Inventors: James H. Nugent, Hampden, Mass.; Hans S. Berger, Plainville, Conn.

[73] Assignee: Coleco Industries, Inc., Hartford, Conn.

[21] Appl. No.: 427,771

[22] Filed: Sep. 29, 1982

[51] Int. Cl.³ ............................ G01P 3/48; G01P 3/54
[52] U.S. Cl. .................................... 324/168; 324/165
[58] Field of Search ............... 324/168, 180, 176, 160, 324/175, 171, 166, 165; 200/16 A, 61.46, 61.39

[56] References Cited

U.S. PATENT DOCUMENTS 3,264,639  8/1966  Lerman ........................ 324/168 X
3,527,905  9/1970  Doi ................................. 200/61.46

*Primary Examiner*—Stanley T. Krawczewicz
*Assistant Examiner*—Jose M. Solis

[57] ABSTRACT

Apparatus operable by the player of a video or electronic game to generate pulses at a rate proportional to the speed of rotation of a rotatable member by closing one of a pair of switches dependent upon the direction of rotation. One of the switches is monitored to determine the direction of rotation. The generated pulses are counted per unit time to provide a velocity signal.

7 Claims, 4 Drawing Figures

APPARATUS FOR GENERATING RATE SIGNALS

FIELD OF THE INVENTION

This invention relates to an apparatus for generating pulses at a rate proportional to the speed of rotation of an object and indicating the direction of rotation. The apparatus is particularly adaptable for use in conjunction with video and electronic games to provide player control of the velocity and direction of movement of a game object.

BACKGROUND OF THE INVENTION

Video games include a player controller which usually comprises a joystick or other directional control to determine the direction of movement of a game marker or object. However, there is no known arrangement where a video game player has control over the velocity of a game object. Co-pending application Ser. No. 06/430,351, filed Sept. 29, 1982, describes and claims a video game in which control of the velocity of a video game object as well as directional control is provided to a game player. The present invention provides a new and improved apparatus which may be used in video games to provide a pulse train which is proportional in rate to the speed of rotation of a player operated member and indicative of the direction of rotation. Apparatus embodying this invention may be utilized in the system of the aforementioned co-pending application.

SUMMARY OF THE INVENTION

Briefly stated, the invention in one form thereof comprises a player rotatable member which is arranged to repetitively actuate a first switch when rotated in one direction and repetitively actuate a second switch when rotated in the other direction. A logic circuit determines the direction of rotation. A member having a pair of depending support legs is positioned on a surface, and includes a resilient bridging member therebetween. Switch actuating legs extend from the bridging member over the switches. The bridging member receives a pin or shaft centrally therethrough which defines two resilient arms on the bridging member. An actuator member extends upwardly from the bridging member and is engageable by a cam on the rotatable member. When engaged by the cam, the actuator causes one of the arms to deflect downwardly and an actuating leg closes a switch. The operation is the same in either direction to close one of the switches dependent on the direction of rotation.

An object of this invention is to provide a new and improved apparatus for generating pulses at a rate proportional to rotation of a member and for determining the direction of rotation of the member in which only one switch need to be actuated to determine both rate and direction.

Another object of this invention is to provide a new and improved device operable by the player of a video or electronic game which permits the player to have control over the velocity of movement of a game object.

A further object of this invention is to provide a device as described which is simple and economical in design and construction and adapted for high volume production.

The features of the invention which are believed to be novel are particularly pointed out and distinctly claimed in the concluding portion of the Specification. The invention, however, together with further objects and advantages thereof, may best be appreciated by reference to the following detailed description taken in conjunction with the drawings.

DETAILED DESCRIPTION OF THE ILLUSTRATED EMBODIMENT

Figure 1:
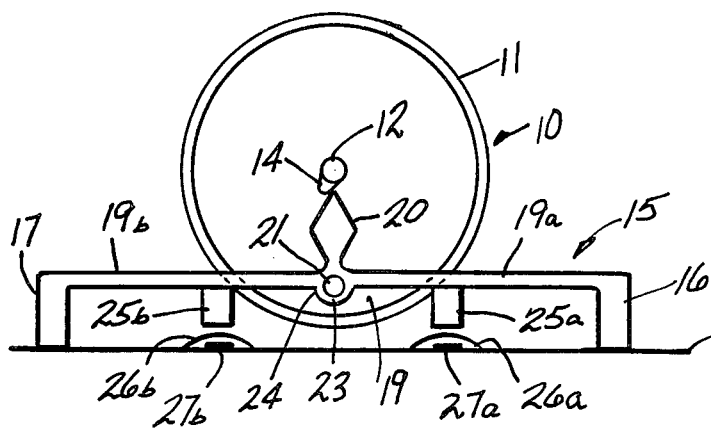
FIGS. 1 and 1a are front elevations of a mechanism, with parts removed, for generating electrical pulses at a rate proportional to rotation of an object.
Figure 2:
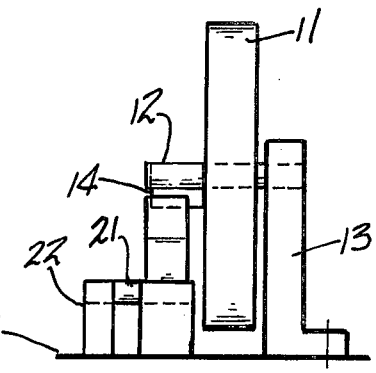
FIG. 2 is a side elevation of the device of FIG. 1.

A mechanism 10 embodying the invention as shown in FIGS. 1 and 2 comprises a rotatable member or spinner 11 operable by a game player. A central shaft 12 on spinner 11 is rotatably mounted to a support 13. Spinner 11 has a cam 14 thereon. A switch actuating member 15 has spaced apart legs 16 and 17 resting on surface 18, and a resilient bridging member 19 extending therebetween. An actuator or follower 20 extending upwardly from bridging member 19 is arranged to be contacted by cam 14 and flex the arms 19a and 19b of resilient bridging member 19. A shaft 21 extends from a support 22 fixed to surface 18 into a passage 23 in an enlarged portion 24 of member 15. Spaced intermediate legs 16 and 17 are switch actuating legs 25a and 25b overlying switches 26a and 26b, respectively. The switches 26a and 26b may be of various types, strip metal, buttons, membrane, clicket, etc. As shown, each switch comprises a deformable element adapted to contact a stationary element 27a or 27b. The shaft 21 divides member 19 into arms 19a and 19b, while isolating downward deflection of one arm from the other.

Figure 1A:
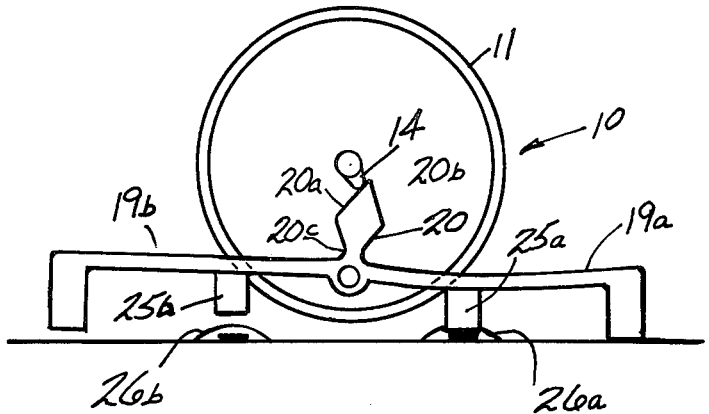

In operation, when spinner 11 is rotated counterclockwise by a game player, cam 14 will contact actuator 20 and cause it to bend or flex arm 19a, as shown in FIG. 1A. As arm 19a bends downwardly, arm 19b bends upwardly tangentially therefrom. Actuating leg 25a will close the contact elements of switch 26a. As cam 14 clears actuator 20, arm 19a will spring back to its unstressed position of FIG. 1 and arm 19b will also return to the position of FIG. 1. Arms 19a and 19b are essentially deflectable springs. As spinner 11 rotates, it will cause one of arms 19a and 19b to close one of switches 26a to 26b at a rate proportional to the rate of its rotation.

The mechanism of FIG. 1 is preferably a two part (plus shaft 21 and support therefor) construction of molded resilient plastic. The arms 19a and 19b are chosen to be of a thickness which permits the desired resilience.

Figure 3:
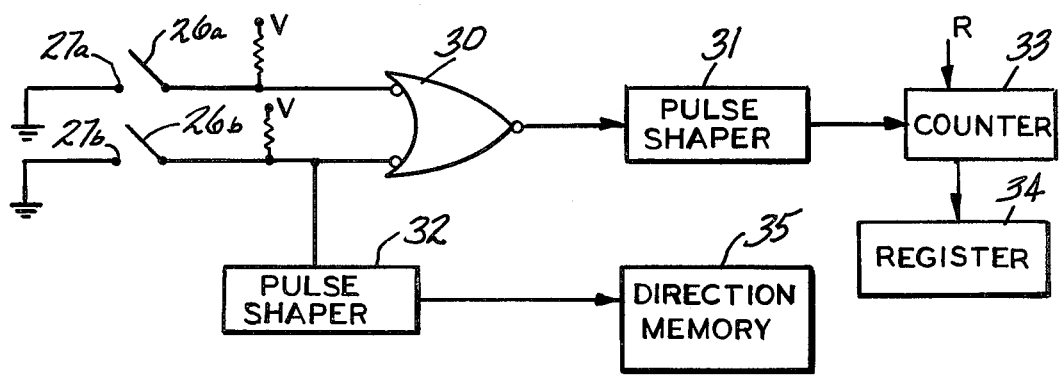
FIG. 3 is a diagram, partially schematic and partly in block form, of a circuit for determining the direction of rotation of the rotatable object of FIG. 1.

The direction of rotation of spinner 11, as well as the rate of a switch closure, may be determined by the circuit of FIG. 3. This circuit comprises the switches 26a and 26b adapted to connect points 27a and 27b, respectively, to ground upon closure. This will ground an inverting input of an OR gate 30 which is otherwise at a high voltage. The output of OR gate 30 is applied to a pulse shaper 31. Switch 26a is coupled to a pulse shaper 32. A suitable pulse shaper is described in the beforementioned co-pending application.

If either of switches 26a or 26b is closed due to rotation of spinner 11, a low level signal is applied to gate 30. The output of gate 30 is shaped by pulse shaper 31 and applied to a binary counter 33. Counter 33 receives periodic reset signal R which may be the video refresh signal of a video game. The number in counter 33 is then transferred to a register 34. Simultaneously, the condition of switch 26b is monitored to determine whether it is low (closed) or high (open) to determine the direction of rotation.

If either of switches 26a and 26b is being closed, a train of pulses will appear at the output of pulse shaper 31. At the same time, a determination is made as to whether switch 26b is closing. If switch 26b is closing, such condition is sensed by a direction memory 35 which is placed in one state by such closures of switch 26b. If switch 26b is not closing, then direction memory (which may be a flip-flop) is in the other state to signify the opposite direction of rotation. This information may be utilized to control the velocity of a video game object as more fully described in the aforementioned copending application.

Bridging member 19 is centrally fixed in position by pin or shaft 21. This permits arms 19a and 19b thereof to be flexed downwardly independent of each other as actuator 20 is deflected by cam 14. Actuator 20 has surfaces 20a and 20b defining an acute angle therebetween, and such surfaces then taper to an area 20c of decreased width. As actuator 20 is deflected as shown in FIG. 1a, as spinner 11 rotates counterclockwise, it will tend to rotate bridging member 19 about shaft 23 with resulting deflection of arm 19a downwardly and arm 19b upwardly. This will cause actuating leg 25a to close switch 26a. Potential energy is stored in arm 19a due to the deflection thereof and when cam 14 clears surface 20a of actuator 20, arm 19a will snap back to the position shown in FIG. 1 due to the stored energy. As counterclockwise rotation of spinner 11 continues, deflection of arm 19a will continue correspondingly and closures of switch 26a will generate a train of pulses at a rate proportional to the speed of rotation of spinner 11. The same operation with downward deflections of arm 19b and closures of switch 26b would take place if spinner 11 was rotated in a clockwise direction. The invention provides an apparatus where only one switch need be actuated to achieve a train of rate pulses and directional control.

The apparatus of the invention is particularly adapted to low cost manufacture. The spinner 11 with cam 14 and shaft 12 thereon may be molded in one piece, as may be member 15. This permits high volume production at low per unit cost.

It may thus be seen that the objects of the invention are efficiently attained. Since certain features of the invention may be changed, and other modifications may become apparent to one skilled in the art, it is intended that the appended claims cover all modifications and embodiments of the invention which do not depart from the spirit and scope thereof.

Having thus described the invention, what is claimed is:

1. Apparatus for determining the rate of rotation of a member and direction of rotation comprising, a member having spaced apart legs resting on a surface, a resilient bridging member extending between said legs, means extending through said bridging member centrally thereof and dividing said bridging member into first and second resilient arms, an actuator member extending from said bridging member upwardly from said extending means, a pair of switches positioned below said bridging member on either side of said actuator member, a pair of switch actuating legs depending from said bridging member, each adapted to operate one of said switches upon deflection of said arms, and a rotatable member, a cam extending from said rotatable member and adapted to contact and deflect said actuator member and cause said actuator member to flex said arms and cause one of said depending legs to close its associated switch, said extending means isolating downward deflection of one of said arms from the other of said arms, whereby the direction of rotation of said rotatable member is indicated by the switch closed and the frequency of the switch closure is indicative of the rate of rotation of said rotatable member.

2. The apparatus of claim 1 wherein said member, said legs, said actuating legs and actuator are integrally formed.

3. The apparatus of claim 1 further including means for counting the number of pulses due to closure of said switches per until time.

4. The apparatus of claim 1 further including means responsive to one of said switches for determining the direction of rotation of said rotatable member.

5. The apparatus of claim 1 wherein said arm is integrally formed on said rotatable member.

6. The apparatus of claim 1 wherein a passage is defined centrally of said bridging member, and said extending means comprises a pin extending into said passage to prevent deflection of said bridging member centrally thereof.

7. The apparatus of claim 1 wherein said cam contacts said actuator on surfaces defining an acute angle, and said actuator tapers to a smaller dimension where it joins said bridging member.

* * * * *

UNITED STATES PATENT AND TRADEMARK OFFICE
CERTIFICATE OF CORRECTION

PATENT NO. : 4,470,012

DATED : September 4, 1984

INVENTOR(S) : James H. Nugent and Hans S. Berger

It is certified that error appears in the above—identified patent and that said Letters Patent is hereby corrected as shown below:

Column 4, line 38, "until" should be --unit--, line 43, "arm" should be --cam--.

Signed and Sealed this

Ninth Day of April 1985

[SEAL]

Attest:

DONALD J. QUIGG

Attesting Officer     Acting Commissioner of Patents and Trademarks